UNITED STATES PATENT OFFICE 2,591,511

VOLTAGE UNBALANCE INDICATING SYSTEM

Alfred Gordon Clarke, Slough, England, assignor to Ronald Trist & Co. Limited, Slough, England, a British company Application October 24, 1949, Serial No. 123,205
In Great Britain October 28, 1948

7 Claims. (Cl. 177—311)

This invention relates to electric circuits primarily intended for the measurement of non-alternating electric signals and its main object is to provide a circuit for the measurement of such signals produced by a source of very high resistance. It is not possible in measuring or making use of this signal to take more than a minute current from the source without reducing the voltage so much that it ceases to approximate to its true no-load value. As an example, a bridge circuit containing a pair of emissive photoelectric cells may develop a signal of say 20 volts, but the value of this voltage is lowered excessively for even approximate measurement if the current taken from the cell is say 0.1 to 0.5 microamp.

A further object in the provision of such an electric circuit which would take only a very small current from a source of primary voltage is that the circuit should also provide a secondary signal related in a pre-determined manner to the primary voltage and having a useable current of at least the order of 10 microamps.

Yet a further object is to employ in such a circuit a cold cathode tube so as to provide a means of measuring a voltage with a sensitivity comparable with that of an expensive electrostatic meter. Still further objects will appear from the following description of the preferred form of circuit arrangement with reference to the annexed circuit diagram.

Figure 1:
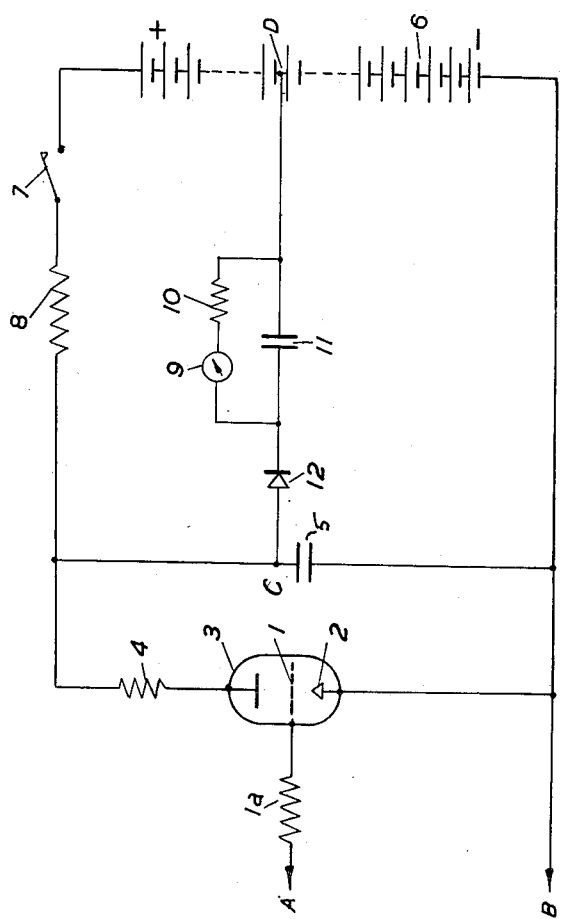
Figure 2:
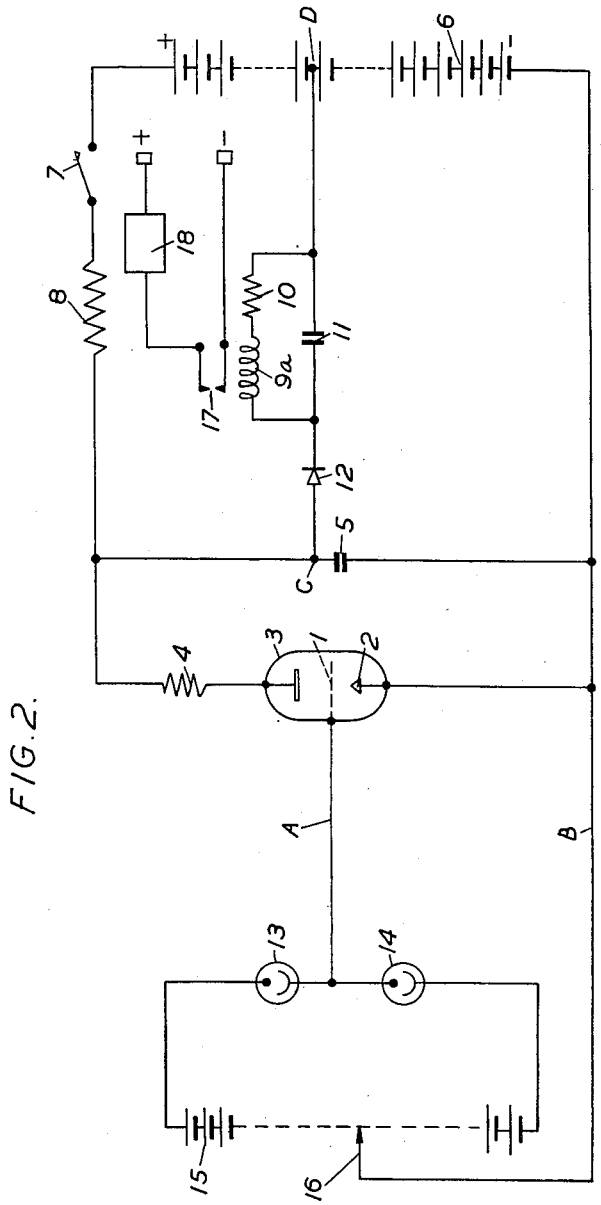

The invention is illustrated in Figure 1 of the drawing applied to a voltage measuring circuit and in Figure 2 it assumes the form of a smoke-detector arrangement.

A primary voltage is applied between the points A and B. Since the potential of the point A should not vary beyond the range 0 to 50 volts below that of B, it may be desirable to apply a part only of the full voltage to be measured. A is connected to the control electrode 1 and B to the cathode 2 of a gas discharge tube 3 of the cold cathode type. An increasing negative bias applied to the control electrode reduces in substantially linear relation the voltage required to fire the tube. The tube 3 is connected, in parallel with a condenser 5 of capacity 0.05 microfarad, across a 210 volt battery 6. The positive feed from the battery includes a switch 7 and a high resistance 8 of 1.5 megohms. In series with the anode is a limiting resistance 4 of 1500 ohms.

When the switch 7 is closed, the condenser 5 is charged by the battery 6 through the resistance 8 until the voltage between the anode and cathode is sufficient to fire the tube. Thereupon the condenser discharges through the resistance 4 and the tube, and the potential of the point C rapidly falls until the tube ceases to conduct. Then the condenser 5 is charged again and the cycle is repeated about 6 times a second. The potential of the point C at the instant of firing bears a predetermined relation to the primary voltage.

Since the range of the potential of C at firing is only about 110 to 160 volts it is only necessary to make measurements in this range. Accordingly a sensitive moving-coil galvanometer 9 is arranged, in parallel with a condenser 11 of capacity 0.3 microfarad, between the point C and a point D in the battery 6. The potential of the point D is 110 volts so that the potential of C at firing rises to values between 0 and 50 volts above that of D, 0 volts corresponding to the largest negative bias on the control electrode which is to be measured.

Between the point C and the condenser 11 and meter 9 there is a rectifier 12. The effect of this is to permit rapid charging of the condenser 11 as the potential of the point C rises before the tube is fired, and to prevent discharge of the condenser except through the meter 9. This discharge through the meter is limited by a resistance 10 of 1.5 megohms to a maximum of about 13 microamps, corresponding to full deflection of the meter. After each firing of the tube, the charge on the condenser and hence the reading on the meter declines gradually, but the frequency of firing is such that a constant primary voltage will produce a substantially constant reading on the meter. If the negative bias due to the primary voltage decreases, the reading of the meter will increase correspondingly at the next firing of the tube. If the negative bias increases, the reading of the meter will decline gradually until the condenser 11 has discharged sufficiently. Since the rectifier 12 should prevent all back leakage, it is of the type employing selenium-covered steel discs.

While the tube 3 is non-conducting, the maximum current taken from the source of primary voltage by the control electrode will be in the range 0.001 to 0.01 microamp. The exact value depends on the internal construction of the tube. However when the tube fires there is the possibility that the control electrode will take a considerably greater current, such as might damage the source or even establish a continuous discharge between the control electrode and the cathode. To prevent this, a resistance $1a$ of 5 megohms is inserted in the connection to the control electrode.

A circuit differing only slightly from that shown in Figure 1 may be used, as another example, in a smoke detector arrangement illustrated in Figure 2 in which elements serving the same functions as corresponding elements in Figure 1 are indicated by the same reference numerals. The voltage developed in a smoke-detecting bridge circuit containing a pair of photoelectric cells 13 and 14 energized by the battery 15 is applied between the points B and A. The meter 9 is replaced by the coil 9a of a self-sustaining relay. Normally, in the absence of smoke, the two cells are illuminated equally so that the bridge is balanced, or substantially balanced, and no voltage is applied to the grid of tube 3. When a beam of light falling on one of the cells is interrupted or reduced by smoke the bridge becomes unbalanced, a voltage is applied to the grid of tube 3, and the voltage across the condenser 11 rises sufficiently at the moment of firing of the tube to close the relay contacts 17 and thereby complete a circuit to a signal lamp or otherwise operate an indicator 18. Since it is not necessary for the rate of discharge of the condenser 11 to be kept as low as in the voltmeter, the value of the limiting resistance 10 may be reduced.

While throughout the above description reference has been made to a tube having a single control electrode, it will be understood that the primary voltage may if desired be applied to the principal control electrode in a tube having more than three electrodes.

I claim:

1. An electric measuring circuit comprising in combination a source of unidirectional voltage having a high internal resistance, a cold-cathode gas discharge tube, means for applying said unidirectional voltage between the cathode and the control electrode of said tube in such a sense as to render said control electrode negative with respect to said cathode, a condenser connected in parallel with the anode and cathode of said tube, a high resistance, a high tension battery, means connecting said battery to charge said condenser through said resistance, a tapping-point on said battery, a second condenser, a rectifier, means for connecting said second condenser and said rectifier in series between said tapping-point and the side of said first condenser adjacent said high resistance, so that said second condenser tends to hold its charge, and means for measuring the voltage across said second condenser.

2. An electric measuring circuit, as claimed in claim 1 in which the voltage of said tapping point lies below the lowest voltage, when said tube fires, of said side of said first condenser adjacent said high resistance.

3. An electric circuit responsive to small unidirectional voltage changes comprising in combination a gas discharge tube having a cathode, an anode and a control electrode, means for applying said unidirectional voltage between the cathode and the control electrode of said tube in such a direction as to render the control electrode negative with respect to the cathode, a condenser connected across the anode and the cathode of said tube, a high impedance, a source of direct current potential connected to charge said condenser through said impedance, a second condenser, a rectifier connected in series with said second condenser between a point of intermediate potential on said source and the end of said impedance remote from said source so that said second condenser is charged from said first condenser and tends to hold its charge, and voltage-responsive means energized by the voltage across said second condenser.

4. A circuit according to claim 3 wherein said voltage-responsive means comprises a voltmeter connected across said second condenser and calibrated to indicate the value of said small unidirectional voltage.

5. A circuit according to claim 3 wherein said voltage-responsive means comprises a self-sustaining relay connected across said second condenser, and indicator means controlled by said relay.

6. A smoke detection system comprising in combination a bridge circuit including a source of polarizing potential and a pair of photoelectric cells connected in opposite arms thereof, said bridge being normally balanced in the absence of smoke and the balance of said bridge being altered by the presence of smoke in the path of one cell, and an indicating circuit including a gas discharge tube having a cathode, an anode and a control electrode, means for applying the unbalance voltage of said bridge circuit between the cathode and the control electrode of said tube in such a direction as to render the control electrode negative with respect to the cathode, a condenser connected in parallel with the anode and cathode of said tube, a high resistance, a high tension battery, means for connecting said battery to charge said condenser through said resistance, a tapping point on said battery, a second condenser, a rectifier, means for connecting said second condenser and said rectifier in series between said tapping point and the side of said first condenser adjacent said high resistance so that said second condenser tends to hold its charge, a relay energized by the voltage across said second condenser, and indicating means operated by said relay when smoke changes the illumination of one of said cells.

7. A circuit for storing an electric charge of substantial energy and at a voltage proportional to the voltage of a source of unidirectional voltage of weak energy and of high impedance, said circuit comprising a gas discharge tube having a cathode, an anode and a control electrode, means for applying said unidirectional voltage between the cathode and the control electrode of said tube in such a direction as to render the control electrode negative with respect to the cathode, a condenser connected across the anode and the cathode of said tube, a high impedance, a source of direct current potential connected to charge said condenser through said impedance, a second condenser, a rectifier connected in series with said second condenser between a point of intermediate potential on said source and the end of said impedance remote from said source so that said second condenser is charged from said first condenser and tends to hold its charge, said first condenser and said high impedance having values such that said first condenser is charged by said source of direct current and is discharged by said tube periodically at a rate of several cycles per second, whereby the charge stored upon said second condenser is maintained at a voltage substantially proportional to the voltage of said weak energy source.

ALFRED GORDON CLARKE.

REFERENCES CITED

The following references are of record in the file of this patent:

UNITED STATES PATENTS

| Number | Name | Date |
| --- | --- | --- |
| 2,100,700 | Schlesinger | Nov. 30, 1937 |
| 2,470,303 | Greenough | May 17, 1949 |